United States Patent [19]

Beckmann et al.

[11] Patent Number: 4,765,829
[45] Date of Patent: Aug. 23, 1988

[54] TREATING LEAD- AND ZINC-CONTAINING STEELMAKING BYPRODUCTS

[75] Inventors: Franz Beckmann, Würselen, Fed. Rep. of Germany; Romain Schmit; Armand Wagner, both of Esch-Sur-Alzette, Luxembourg

[73] Assignee: Laborlux S. A., Esch-Sur-Alzette, Luxembourg

[21] Appl. No.: 905,270

[22] Filed: Sep. 8, 1986

[30] Foreign Application Priority Data

Sep. 9, 1985 [LU] Luxembourg .......................... 86070

[51] Int. Cl.⁴ .............................................. C22B 7/02
[52] U.S. Cl. ........................................... 75/25; 75/28; 423/97; 423/108
[58] Field of Search .................. 75/25, 4, 28; 423/97, 423/108

[56] References Cited

U.S. PATENT DOCUMENTS

| | | | |
|---|---|---|---|
| 2,442,674 | 6/1948 | Bardwell | 75/25 |
| 3,770,416 | 11/1973 | Goksel | 75/25 |
| 4,363,654 | 12/1982 | Frederick et al. | 75/41 |
| 4,396,424 | 8/1983 | Yatsunami et al. | 75/25 |
| 4,612,041 | 9/1986 | Matsuoka et al. | 75/25 |

FOREIGN PATENT DOCUMENTS 2154223 9/1985 United Kingdom .................. 75/4

Primary Examiner—Melvyn J. Andrews
Attorney, Agent, or Firm—Herbert Dubno; Andrew Wilford

[57] ABSTRACT

According to the instant invention fine and very fine granular zinc- and lead-containing oxidic byproducts are mixed with thermally inert additives and are hot briquetted with caking coal as a binder at a temperature of 490°±40° C. using sufficient carbon to reduce all of the metallic components in the byproducts. Then this mixture is briquetted and heated to more than 700° C, and is maintained at this high temperature for a predetermined time to reduce, that is deoxidize, most of the oxidic components of the briquets, especially zinc, lead, and iron oxides. When the byproducts are not dry, which is standard with a wet scrubbing system for cleaning stack gases, the resultant slurry must be dried before it can be treated according to this invention. The carbon according to the invention is added as fine-granular caking coal in portions of at least 20% by weight. Preferably the portion is between 25% and 35% and up to 40%.

12 Claims, 1 Drawing Sheet

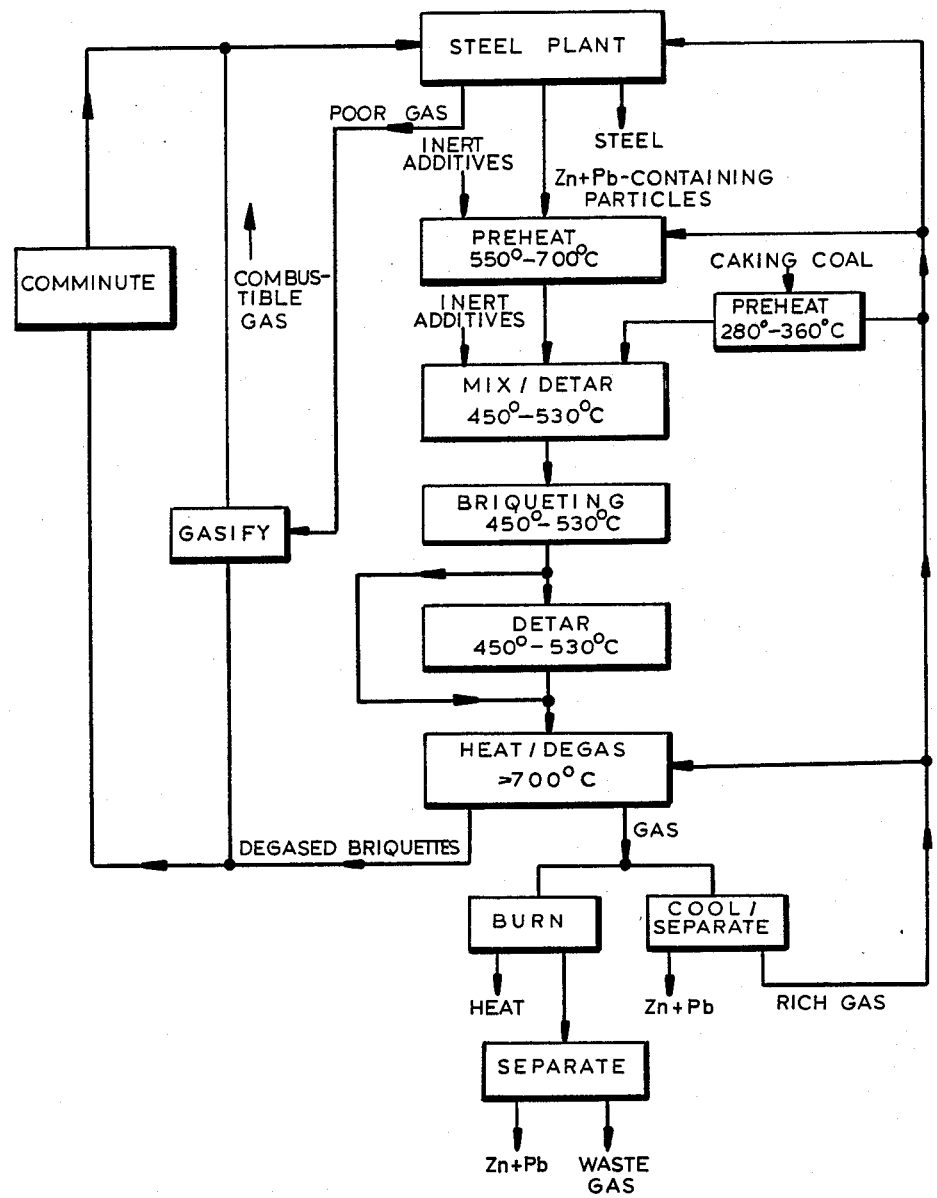

TREATING LEAD- AND ZINC-CONTAINING STEELMAKING BYPRODUCTS

FIELD OF THE INVENTION

The present invention relates to a method of treating lead- and zinc-containing byproducts of a steel or iron plant. More particularly this invention concerns a method of recovering the zinc and lead from such byproducts and of recycling the balance.

BACKGROUND OF THE INVENTION

The production of steel and iron creates various byproducts that contain zinc and lead, both relatively harmful metals. The particles stripped from the stack gases of such a plant contain some iron, and a portion of zinc and lead that depends on the type of additives, that is ore, sinter, pellets in a blast furnace, scrap for steelmaking, and also on the process employed. The particles and slags from a blast furnace normally have a zinc content between 1% (by weight as hereinafter) and 40% and a lead content between 0.2% and 10%. In a steel plant the zinc content of the byproducts is between 0.2% and 5%, and occasionally higher, and the lead content between 0.1% and 2%.

Zinc, which is found in some ores and which is present when galvanized scrap is processed, is a particular problem in a blast furnace because of the low temperature at which it is vaporized and reduced. Thus any zinc that is not oxidized stays in the furnace where it builds up on and reacts with the walls. Lead, because of its very high vapor pressure, sinks in the furnace to form a pool underneath the hot metal in the hearth where it serves no useful function. Thus it is out of the question to reintroduce lead- and zinc-containing fines, even when they have a high carbon and/or iron content, back into the process. As a result these lead- and zinc-containing materials are simply stockpiled for lack of anything better to do with them. Since zinc and lead can be leached out of these particles and slags, such storage is a particularly difficult environmental problem. In addition such profitless storage or disposal of such materials means the loss of a substantial amount of iron, carbon, zinc, and lead. Obviously the current storage solution is a short-term one offering no long-term environmental protection.

For these reasons several different treatment methods have been tried which make it possible to separate zinc and lead out of such materials and to metallize the iron content in a solid form so that it can be fed back into the production line at the smelting plant.

Mainly the zinc- and lead-containing particles, which either already include some carbon-containing material to reduce the content of zinc and lead oxide or to which such carbon-containing reducing agents have been added, are mixed with an appropriate binder and are then transformed by pelletizing into small bodies with sufficient cohesiveness for handling and treatment. The thus obtained bodies are normally heated in a rotary kiln for sufficient time at 1000° C. to 1200° C. to vaporize the zinc. This reduces all of the zinc oxide to metallic zinc which passes as a vapor into the interior of the furnace and is carried off by a gas stream or the exhaust. Normally the zinc is oxidized in the furnace and the zinc oxide is separated as airborne particles from the gases. Lead is stripped out mainly as a chloride or a sulfide.

The hitherto known processes only allow a modestly efficient treatment if byproducts with a relatively high percentage of the materials to be removed can be used and if for efficiency's sake large amounts of the byproducts are available for continuous treatment. In addition the pellets thus produced are normally too small for further treatment. These pellets must therefore be briquetted in order to be used for example in a blast furnace. Such briquetting is expensive because their heat is lost before they are again reintroduced into the process.

These methods as well as the also known leaching methods do not solve the ecological problem. A large portion of the byproducts must be stored because it does not have a sufficient quantity of the materials for economically efficient treatment. Thus the carbon and iron contained in these byproducts is lost.

OBJECTS OF THE INVENTION

It is therefore an object of the present invention to provide an improved method of treating zinc- and lead-containing byproducts of a steel or iron plant.

Another object is the provision of such a method of treating zinc- and lead-containing byproducts which overcomes the above-given disadvantages, that is which efficiently removes the valuable zinc and lead and which can work on flue dusts and the like with a relatively low content of these metals which are so harmful in a steel- or iron-making plant.

A further object is to provide such a method which also allows the elimination of most of the alkalis from the byproducts of a steel or iron plant.

SUMMARY OF THE INVENTION

According to the instant invention fine and very fine granular zinc- and lead-containing oxidic byproducts are mixed with thermally inert additives and are hot briquetted with caking coal as a binder at a temperature of 450° C. to 530° C. using sufficient carbon to reduce all of the metallic components in the byproducts. Then this mixture is briquetted and heated to more than 700° C. and is maintained at this high temperature for a predetermined time to reduce, that is deoxidize, most of the oxidic components of the briquets, especially the zinc-, lead-, and iron-containing oxides. When the byproducts are not dry, which is standard with a wet scrubbing system for cleaning stack gases, the resultant slurry must be dried before they can be treated according to this invention.

The carbon according to the invention is added as fine-granular caking coal in portions of at least 20% by weight. Preferably the portion is between 25% and 35% and up to 40%. The use of caking, binding soft coal as a binder in the hot briquetting in conjunction with various other thermally inert fine-granular materials effectively dezincs the byproducts. In this manner it is possible to influence the composition of the bodies produced after dezincing for recycling or to treat other byproducts of the steel plant. Thus for example rolling scales, iron turnings, or ore can be added to the mixture to increase its iron content. Other carbonaceous material having no binder effect can be used such as fine-granular inert fuels like anthracite, coke fines, or oil coke.

DESCRIPTION OF THE DRAWING

The above and other features and advantages will become more readily apparent from the following, reference being made to the accompanying drawing whose sole figure is a schematic flow chart of the method of this invention.

SPECIFIC DESCRIPTION

As seen in the drawing the briquetting mixture is produced by preheating the byproducts from a steel plant with, if necessary, additives of inert materials by means of a combustible gas to a temperature of 550°–700° C. and the caking coal is preheated before being mixed in to a temperature of 280°–360° C. which is below its softening point. Then the separately preheated components are brought together and mixed. The mixture is worked at 490° C. +/−40° C. so as to partially detar it and is briquetted. Subsequently the hot briquets are held at the briquetting temperature for at least 30 minutes to fully detar them and partially degas them. Before cooling they are then brought to a temperature of over 700° C., preferably 900° C.–1000° C. so as to fully degas them. This can be done by indirectly heating the briquets, for example in a gas-heated kiln, to the desired temperature. If the briquets contain electrically conductive materials or are mixed with same, the degassing can be done by direct heating in an induction kiln.

This temperature increase in the presence of carbon reduces the zinc oxide and to a certain extent also the iron oxide as is known. The zinc is as a result of its high vapor pressure vaporized as a metal at the treatment temperature together with pyrolysis gas and carbon oxide. It is cooled and condensed out. Since according to the method of this invention temperatures of 1300° C. and above are not used—temperatures at which lead metallically vaporizes—the lead is as a result of its too low vapor pressure not vaporized as a metal. It is vaporized mainly as lead sulfide, lead chloride, and to a limited extent also as lead oxide. The iron remains after partial or complete metallization in briquets.

It has been proven that with the method of the invention the considerable extra carbon takes a positive part in separating out the harmful metals. The separation can be positively influenced by corresponding addition to the mixture of a highly basic $CaO + MgO/SiO_2$ of the briquets or by adding chlorides, mainly calcium chloride to influence the vaporization of lead and alkalies.

The dezinced and deleaded briquets have in comparison to the known methods of treating byproducts of an iron or steel plant they advantage that they are of the size and solidity needed for use directly in the blast furnace, converter, or electric furnace or can be used after comminution in sinter arrangements or even blown into a blast furnace. In addition the briquets which are produced continuously in a production process at high energy efficiency have such a carbon content that they can also be used as carbon carrier or a solid fuel. Even the above-mentioned setting of the basicity gives in addition to the advantageous effect on the separation of the harmful metals, advantages for the use in reduction and sinter processed.

According to the method of the invention the gas formed mainly as pyrolysis gas or CO after cooling and separation of the zinc and lead can be separated as a fuel for heating of the products loaded into the hot briquetter. Further energy can be recovered by cooling the hot briquets by means of an inert gas stream.

The method can also be controlled by heating the briquets directly after briquetting to more than 700° C. and degassing them and either burning the hot gases devolving during the reduction process immediately or selectively oxidizing the zinc contained therein as metal vapor by oxidation with steam or carbon dioxide (stack gas) to zinc oxide without previously condensing out the condensable gas fraction, mainly zinc vapor. In this manner zinc and lead can be separated out of the stack gas as oxides.

The method according to the invention makes it therefore possible, in addition to recovering useful products for the zinc and lead industry, to make use of waste products of the steel industry directly for recycling. At the same time as a result of the more efficient energy use of the instant invention byproducts with a low contaminant content can be efficiently processed locally in small quantities or regionally so that long-term storage of these hostile byproducts is eliminated.

Further according to the invention the hot briquets are after being dezinced and deleaded at least partially gasified. In this manner the elements containing iron or more or less carbon can be returned to the smelting process.

The gasification is best when stack gas is used as a part of the gasification means in order to convert at least a part of the carbon dioxide and steam therein into carbon monoxide and hydrogen so as to substantially increase the heat value of the stack gas.

We claim:
1. A method of treating byproducts of a steel or iron plant, the method comprising the steps of sequentially:
   (a) heating and mixing fine-granular byproducts containing carbon, zinc oxide, lead oxide, and iron with at least one of the following additives
       low-volatile, fine-granular carbonaceous material including anthracite, coke fines, and oil coke;
       fine-particulate iron-containing materials including iron ore, iron shavings, and rolling scale; and
       oxides and/or chlorides of alkaline earths, whereby a mixture is formed;
   (b) briquetting the mixture with caking coal as a binder at a temperature of 450° C. to 530° C. with the portion of carbon substantially more than the quantity necessary for the reduction of the zinc and lead in the mixture, whereby briquets are formed;
   (c) heating the briquets to more than 700° C. and at most around 1000° C. and maintaining them at this temperature for a predetermined time to drive gases including carbon oxide out of them and reduce substantially all the zinc and lead oxides to metallic zinc and lead compounds carried in the driven-out gas;
   (c') burning the gases driven out of the briquets in step (c) without condensing the metallic zinc therefrom to oxidize the metalllic zinc and lead compounds and form a waste gas carrying zinc and lead oxides;
   c" separating the zinc and lead oxides from the waste gas; and
   (d) recycling the briquets from which the zinc and lead have been separated to the iron or steel plant.

2. The method defined in claim 1 wherein the caking soft coal is mixed with the fine-granular byproducts in portions of from 20% to 40% by weight and with the additives in portions of from 25% to 50% by weight.

3. The method defined in claim 1, further comprising the step of
   (a') during or before step (a) heating the byproducts to 550° C. to 700° C.

4. The method defined in claim 1, further comprising the step of (a″) preheating the caking coal to 280° C. to 360° C. before mixing it with the byproducts.

5. The method defined in claim 1, further comprising the step of:
(a‴) preheating the additives to 550° C. to 700° C. before mixing them with the byproducts.

6. The method defined in claim 1 wherein some of the carbon in the byproducts is tar, the method further comprising the step of:
(a″″) continuously moving the mixture of step (a) for at least 30 seconds at 450° C. to 530° C. to partially detar it.

7. The method defined in claim 1, further comprising the step of:
(b′) holding the briquets at 450° C. to 530° C. for at least 30 min after step (b) and before step (c).

8. The method defined in claim 1 wherein step (c) generates a combustible rich gas, the method further comprising the step of:
(e) recirculating the combustible rich gas and using it in at least one of steps (a), (b), and (c) to provide heat therefor.

9. The method defined in claim 1, further comprising the step (e) after step (d) of comminuting the briquets before feeding them back to the steel or iron plant.

10. The method defined in claim 9 wherein step (e) further comprises the step of blowing the comminuted briquets back to the plant.

11. The method defined in claim 1, further comprising the steps of
(e) gasifying the briquets to form a poor combustible gas and
(f) recycling this combustible gas.

12. The method defined in claim 11, further comprising the step (g) of recirculating the poor gas as a fuel to gasify the briquets of step (d).

* * * * *